United States Patent
Kim et al.

(10) Patent No.: US 11,801,766 B2
(45) Date of Patent: Oct. 31, 2023

(54) VEHICLE AND CONTROL METHOD THEREOF INCLUDING RECHARGING A BATTERY WITH A FIRST CURRENT VALUE WHEN A USER CONSENTS AND WHERE A CHARGING INTERRUPTION HISTORY EXISTS

(71) Applicants: HYUNDAI MOTOR COMPANY, Seoul (KR); KIA CORPORATION, Seoul (KR)

(72) Inventors: Youngsik Kim, Anyang-si (KR); Do Hoon Kim, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 391 days.

(21) Appl. No.: 17/337,106

(22) Filed: Jun. 2, 2021

(65) Prior Publication Data
US 2022/0118874 A1    Apr. 21, 2022

(30) Foreign Application Priority Data
Oct. 19, 2020 (KR) .................. 10-2020-0135099

(51) Int. Cl.
| B60L 53/62 | (2019.01) |
| B60L 53/66 | (2019.01) |
| B60L 53/65 | (2019.01) |
| B60L 53/60 | (2019.01) |

(52) U.S. Cl.
CPC .............. *B60L 53/62* (2019.02); *B60L 53/60* (2019.02); *B60L 53/65* (2019.02); *B60L 53/66* (2019.02)

(58) Field of Classification Search
CPC .......... B60L 53/62; B60L 53/60; B60L 53/65; B60L 53/66
USPC ...................................................... 320/109
See application file for complete search history.

(56) References Cited

FOREIGN PATENT DOCUMENTS

| CN | 105207303 A | * | 12/2015 |
| KR | 10-1501918 B1 | | 3/2015 |
| KR | 20210085211 A | * | 7/2021 |

* cited by examiner

*Primary Examiner* — Richard Isla
*Assistant Examiner* — Manuel Hernandez
(74) *Attorney, Agent, or Firm* — MCDONNELL BOEHNEN HULBERT & BERGHOFF LLP

(57) ABSTRACT

Disclosed is a vehicle including a battery, and a controller configured to check identification information of a charger when the charger and the battery are connected, determine whether a charging interruption history exists in the charger based on the identification information of the charger, determine whether or not a user consents to perform recharging of the battery with a first current value in a case where the charging interruption history exists, and perform the recharging of the battery with the first current value depending on the consent of the user or not.

20 Claims, 3 Drawing Sheets

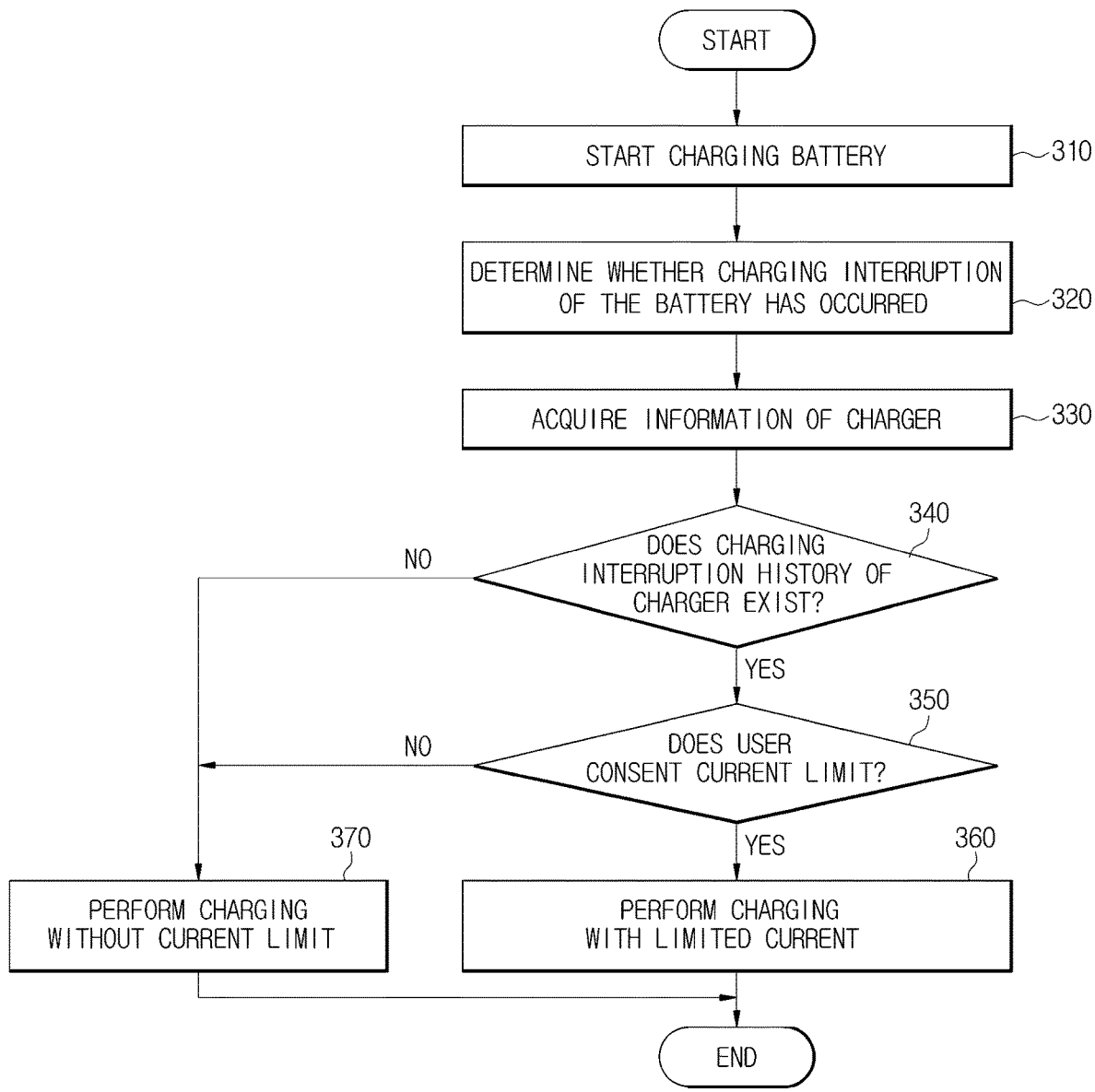

VEHICLE AND CONTROL METHOD THEREOF INCLUDING RECHARGING A BATTERY WITH A FIRST CURRENT VALUE WHEN A USER CONSENTS AND WHERE A CHARGING INTERRUPTION HISTORY EXISTS

CROSS REFERENCE TO RELATED APPLICATIONS

This application is based on and claims priority under 35 U.S.C. § 119 to Korean Patent Application No. 10-2020-0135099, filed on Oct. 19, 2020, in the Korean Intellectual Property Office, the disclosure of which is incorporated by reference herein in its entirety.

BACKGROUND

1. Field

The disclosure relates to a vehicle and a control method thereof.

2. Description of the Related Art

In recent years, the introduction of electric vehicles has been actively promoted to reduce the use of fossil fuels and greenhouse gas emissions. Plug-in hybrid vehicles, electric vehicles, etc. require users to directly charge secondary batteries or replace batteries.

Therefore, when a charging interruption problem occurs during charging of an electric vehicle, a preemptive measure may not be performed as a process in which an operator dispatches to the site and analyzes the cause of occurrence, so that the problem may not be resolved quickly.

SUMMARY

It is an aspect of the disclosure to provide a vehicle capable of performing a preemptive measure to perform charging with a limited current in a case where a charging interruption history of a corresponding charger exists when a charging of a battery of an electric vehicle is interrupted.

Additional aspects of the disclosure will be set forth in part in the description which follows and, in part, will be obvious from the description, or may be learned by practice of the disclosure.

In accordance with an aspect of the disclosure, a vehicle includes a battery, and a controller configured to check identification information of a charger when the charger and the battery are connected, determine whether a charging interruption history exists in the charger based on the identification information of the charger, determine whether or not a user consents to perform recharging of the battery with a first current value in a case where the charging interruption history exists, and set to perform the recharging of the battery with the first current value depending on the consent of the user or not.

The vehicle may further include a storage configured to store the charging interruption history information corresponding to the identification information of the charger.

The controller may be configured to store the charging interruption history information corresponding to the identification information of the charger in an external server in a case where a charging interruption occurs during charging of the battery.

The first current value may be smaller than a current value of the charger when charging is interrupted.

The controller may be configured to set to perform recharging of the battery from the charger with a second current value in a case where the charging interruption history does not exist.

The controller may be configured to set to perform recharging of the battery from the charger with the first current value in a case where the user consents.

The controller may be configured to set to perform recharging of the battery from the charger with a second current value in a case where the user does not consent.

The first current value may be smaller than the second current value.

The controller may be configured to determine whether the user consents or not using at least one of an audio video navigation (AVN) and a terminal of the user.

The controller may be configured to determine whether the charging interruption history exists using a BLUE-LINK®.

In accordance with an aspect of the disclosure, a control method of a vehicle includes checking identification information of a charger when the charger and a battery are connected, determining whether a charging interruption history exists in the charger based on the identification information of the charger, determining whether or not a user consents to perform recharging of the battery from the charger with a first current value in a case where the charging interruption history exists, and setting to perform the recharging of the battery with the first current value depending on the consent of the user or not.

The control method may further include storing the charging interruption history information corresponding to the identification information of the charger in the vehicle.

The control method may further include storing the charging interruption history information corresponding to the identification information of the charger in an external server in a case where a charging interruption occurs during charging of the battery.

The first current value may be smaller than a current value of the charger when charging is interrupted.

The control method may further include setting to perform recharging of the battery from the charger with a second current value in a case where the charging interruption history does not exist.

The control method may further include setting to perform recharging of the battery from the charger with the first current value in a case where the user consents.

The control method may further include setting to perform recharging of the battery from the charger with a second current value in a case where the user does not consent.

The first current value may be smaller than the second current value.

The control method may further include determining whether the user consents or not using at least one of an audio video navigation (AVN) and a terminal of the user.

The control method may further include determining whether the charging interruption history exists using a BLUELINK®.

BRIEF DESCRIPTION OF THE FIGURES

These and/or other aspects of the disclosure will become apparent and more readily appreciated from the following description of the embodiments, taken in conjunction with the accompanying drawings of which:

FIG. 3 is a flowchart illustrating a method of controlling a vehicle according to another embodiment of the disclosure.

DETAILED DESCRIPTION

Figure 1:
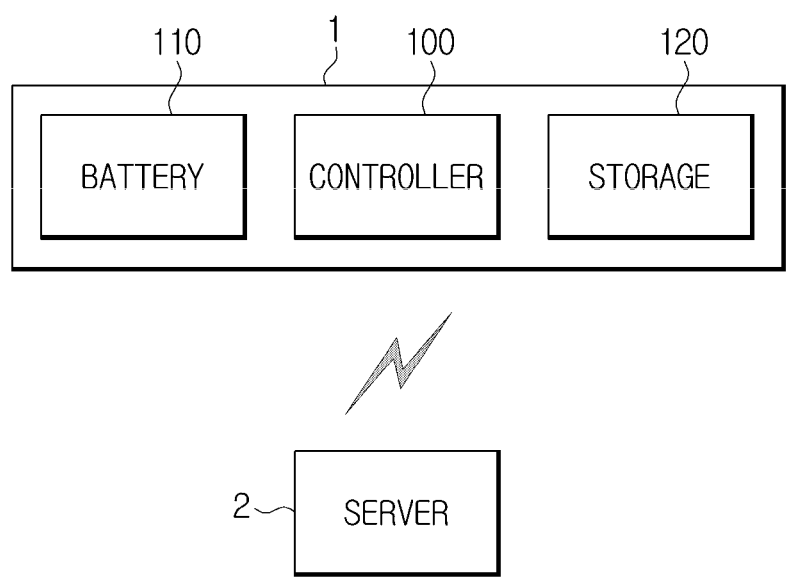
FIG. 1 is a control block diagram of a vehicle according to an embodiment of the disclosure.

Like reference numerals refer to like elements throughout the specification. This specification does not describe all the elements of the embodiments, and duplicative contents between general contents or embodiments in the technical field of the present disclosure will be omitted. The terms 'part,' 'module,' 'member,' and 'block' used in this specification may be embodied as software or hardware, and it is also possible for a plurality of 'parts,' 'modules,' 'members,' and 'blocks' to be embodied as one component, or one 'part,' 'module,' 'member,' and 'block' to include a plurality of components according to embodiments.

Throughout the specification, when a part is referred to as being "connected" to another part, it includes not only a direct connection but also an indirect connection, and the indirect connection includes connecting through a wireless network.

Also, when it is described that a part "includes" an element, it means that the element may further include other elements, not excluding the other elements unless specifically stated otherwise.

Throughout the specification, when a member is described as being "on" another member, this includes not only a case where one member is adjacent to the other member, but also a case where another member is placed between the two members.

The terms 'first,' 'second,' etc. are used to distinguish one element from another element, and the elements are not limited by the above-mentioned terms.

The singular forms "a," "an," and "the" include plural referents unless the context clearly dictates otherwise.

In each step, an identification numeral is used for convenience of explanation, the identification numeral does not describe the order of the steps, and each step may be performed differently from the order specified unless the context clearly states a particular order.

Hereinafter the disclosure will be described in detail with reference to the accompanying drawings.

FIG. 1 is a control block diagram of a vehicle 1 according to an embodiment of the disclosure. As illustrated in FIG. 1, the vehicle 1 may include a battery 110, a storage 120 configured to store identification information of a charger and charging interruption history information corresponding to the identification information of the charger, and a controller 100. The controller 100 is configured to store the identification information of the charger and the charging interruption history information corresponding to the identification information of the charger in an external server 2 when the charger and the battery 110 are connected for charging, determine whether a charging interruption history exists in the charger based on the identification information of the charger, determine whether or not a user consents to perform recharging of the battery 110 with a first current value when the charging interruption history exists, and set to perform recharging of the battery 110 with the first current value depending on the consent of the user or not.

For example, while the vehicle 1 is running, a generator may convert rotational energy of an engine into electric energy, and the battery 110 may receive and store electric energy from the generator.

In addition, the battery 110 may supply power for starting the engine to a starting motor for driving of the vehicle 1 or may supply power to electrical components (not shown) of the vehicle 1.

A battery sensor (not shown) may acquire information related to the battery 110. For example, the battery sensor (not shown) may measure and output information on the battery 110 such as a rated capacity of the battery 110, a state of charge (SoC) of the battery 110, a state of health (SoH) of the battery 110, an output voltage of the battery 110, an output current of the battery 110, and a temperature of the battery 110.

A battery management device (not shown) may manage the state of charge (SoC) and/or the state of health (SoH) of the battery 110. For example, the battery management device (not shown) may maintain the state of charge (SoC) of the battery 110 to a certain level or higher in order to smoothly start the engine and prevent the state of health (SoH) of the battery 110 from shortening.

The storage 120 may store the charging interruption history information of the charger corresponding to the identification information of the charger connected to the vehicle 1 to charge, and the identification information of the charger may be MAC Address.

The storage 120 may temporarily store stored data. The data may include driving information of the vehicle 1 and state information of the battery 110 and may include an amount of charge per distance indicating an increase in the state of charge (SoC) of the battery 110 per unit distance.

The storage 120 may provide programs and/or data to a processor in response to a memory control signal of the processor.

The storage 120 may include a volatile memory such as static random access memory (S-RAM) and dynamic random access memory (D-RAM) for temporarily storing data.

In addition, the memory may include a nonvolatile memory such as read only memory (ROM), erasable programmable read only memory (EPROM), and electrically erasable programmable read only memory (EEPROM) for storing control programs and control data for a long time.

In order to charge the battery 110 of the vehicle 1, the controller 100 may check identification information of the charger when the charger and the battery 110 are connected.

The controller 100 may determine whether the charging interruption history exists in the charger based on the identification information of the charger.

In order to charge the battery 110 of the vehicle 1, the controller 100 may check the identification information of the charger when a charging interruption occurs while charging is performed by connecting the charger and the battery 110.

When a charging interruption occurs while charging is performed, the controller 100 may determine whether the charging interruption history exists in the charger based on the identification information of the charger.

The controller 100 may store the charging interruption history information corresponding to the identification information of the charger and a current value at the time of charging interruption in at least one of the external server 2 and the storage 120.

When the charging interruption history information corresponding to the identification information of a corresponding charger is previously stored in the external server 2, the controller 100 may receive a current value of the corresponding charger at a time point when a charging interruption occurs from the external server 2 through a BLUE-LINK® while charging is performed by connecting the charger and the battery 110.

When the charging interruption history exists, the controller 100 may determine whether the user consents to perform recharging of the battery 110 from the charger with the first current value. The first current value may be a current value smaller than a current value at a point in time when charging is interrupted.

The controller 100 may transmit and store CAN information of the vehicle 1 to the external server 2 when the charging interruption history exists.

When the user consents to perform recharging of the battery 110 with the first current value, the controller 100 may set the charger to perform recharging of the battery 110 with the first current value.

When the user does not consent to perform recharging of the battery 110 with the first current value, the controller 100 may set the charger to perform recharging of the battery 110 using a second current value. The second current value may be a current value at a point in time when a charging interruption occurs, and the first current value may mean a current value smaller than the second current value.

In order to determine whether the user consents or not, the controller 100 may determine using at least one of an audio video navigation (AVN) of the vehicle 1 and a smart phone of the user.

The controller 100 may display a message on the AVN of the vehicle 1 as to whether to perform recharging of the battery 110 from the charger with the first current value.

The controller 100 may display a message on whether to perform recharging of the battery 110 with the first current value on an application screen of the smart phone of the user.

The controller 100 may receive a selection input of the user corresponding to the message.

When the charging interruption history does not exist, the controller 100 may determine whether the user consents to recharge the battery 110 from the charger with the second current value. The second current value may be a current value at a point in time when charging is interrupted, and the first current value may mean a current value smaller than the second current value.

The controller 100 may include the storage 120 to store control programs and/or control data for charging the battery 110, and the processor to generate a control signal in response to the control programs and the control data stored in the storage 120.

Although an embodiment according to the disclosure discloses a configuration in which the vehicle 1 stores the charging interruption history information corresponding to the identification information of the charger in the external server 2 and receives the charging interruption history information corresponding to the identification information of the charger from the external server 2, the charging interruption history information corresponding to the identification information of the charger may be stored in the storage 120 inside the vehicle 1, and the operation of the controller 100 may be performed using at least one of the identification information of the charger and the charging interruption history information stored in the storage 120, and a current value at the time of charging interruption.

Figure 2:
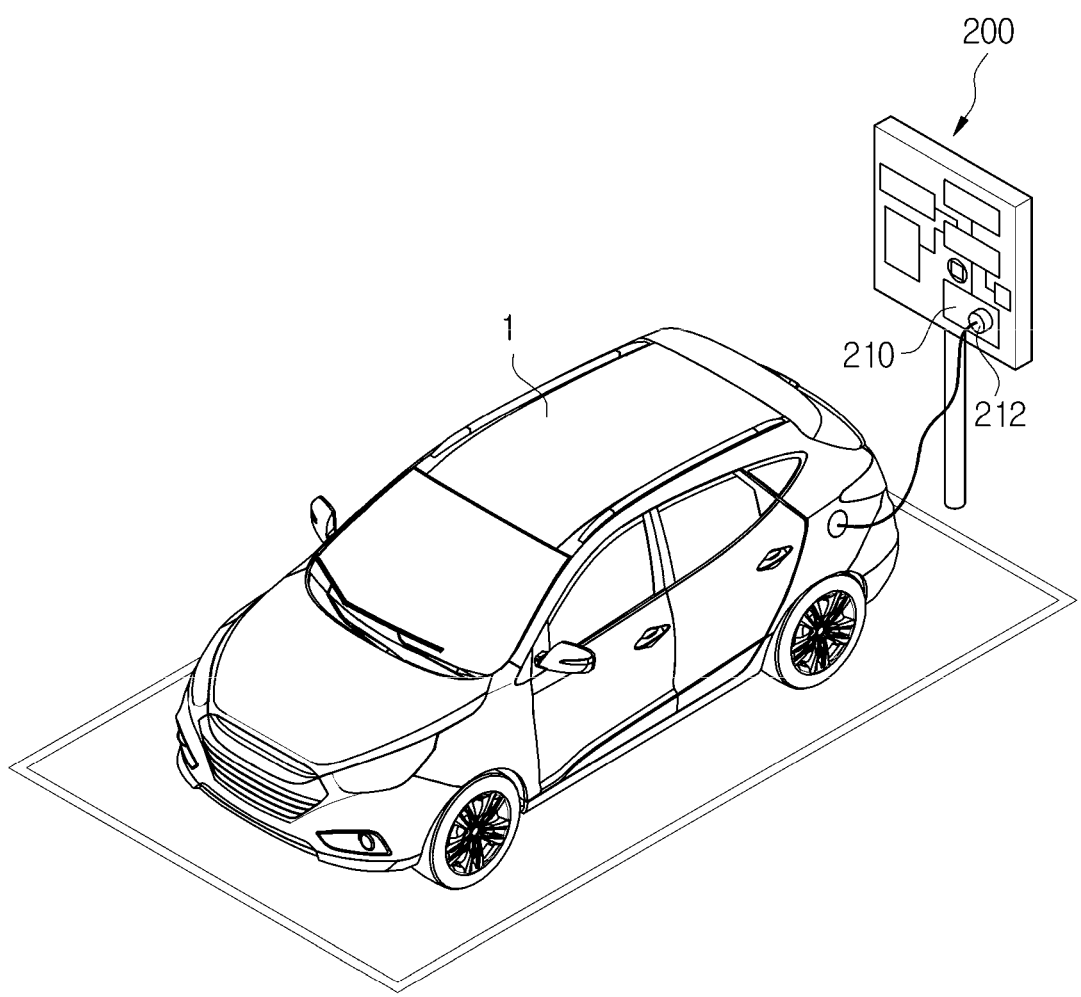
FIG. 2 is a view illustrating a method of charging a battery through a charger by the vehicle according to an embodiment of the disclosure.

FIG. 2 is a view illustrating a method of charging a battery through a charger by the vehicle 1 according to an embodiment of the disclosure.

By coupling a connector of the vehicle 1 to a connector 212 formed in a charging port 210 of a charger 200, the battery 110 of the vehicle 1 and the charger 200 may be connected.

The vehicle 1 may receive and check identification information of the charger 200 when the battery 110 and the charger 200 are connected.

The vehicle 1 may determine whether the charging interruption history exists based on the identification information of the charger 200.

The vehicle 1 may store the charging interruption history information corresponding to the identification information of the charger 200 in the external server 2 or in the storage 120 inside the vehicle 1.

In a case where the charging interruption history information corresponding to the identification information of the corresponding charger 200 is previously stored in the external server 2, when the battery 110 and the charger 200 are connected, the vehicle 1 may check the identification information of the charger 200 and may determine whether the charging interruption history of the corresponding charger 200 exists based on the identification information.

When a charging interruption occurs while the battery 110 and the charger 200 are connected and the battery 110 is charged, the vehicle 1 may determine whether the charging interruption history of the corresponding charger 200 exists and set to charge the battery 110 with the first current value when the charging interruption history exists.

In a case where the charging interruption history of the corresponding charger 200 does not exist, the vehicle 1 may set to charge the battery 110 with the second current value without limiting the current value.

FIG. 3 is a flowchart illustrating a method of controlling the vehicle 1 according to another embodiment of the disclosure.

The vehicle 1 may be connected to the charger 200 to start charging the battery 110 at 310.

The vehicle 1 may determine whether a charging interruption of the battery 110 has occurred at 320.

While a charging current for charging the battery 110 increases, noise may occur, or a communication strength of a power line communication (PLC) may be generated by a charger that does not comply with international standards. A message transmitted from the charger may not be received due to noise, and thus a charging interruption of the battery 110 may occurs.

In addition, during the PLC communication, a charging current value may be transmitted and received at 50 m/s in the step of supplying the charging current to the vehicle 1 in a current demand step, and at this time, the charging current value may increase from 0 A to 350 A.

In a case where a charging interruption of the battery 110 occurs, the vehicle 1 may acquire identification information of the charger 200 at 330.

The identification information of the charger 200 may be the MAC Address of the corresponding charger 200.

In a case where charging interruption history information corresponding to the identification information of the corresponding charger is previously stored in the external server 2, the vehicle 1 may receive a current value of the corresponding charger at a time point when a charging interruption occurs from the external server 2 through the BLUELINK® while charging is performed by connecting the charger 200 and the battery 110.

The vehicle 1 may determine whether a charging interruption history exists in the information on the charger 200 at 340.

In a case where the charging interruption history of the corresponding charger 200 exists, the vehicle 1 may determine whether the user consents to perform recharging of the battery 110 with the first current value by limiting the current value in the charger 200 at 350.

In the case where the charging interruption history of the corresponding charger 200 does not exist, vehicle 1 may be set to charge the battery 110 with the second current value without limiting the current value at 370.

The first current value may be a current value smaller than a current value at a point in time when the charging is interrupted.

When the user consents to perform recharging of the battery 110 with the first current value, the vehicle 1 may set to perform recharging of the battery 110 with the first current value in the charger 200 at 360.

In a case where the user does not consent to perform recharging of the battery 110 with the first current value, the vehicle 1 may set to perform recharging of the battery 110 with the second current value without limiting the current value in the charger 200 at 370.

The second current value may be a current value when charging is interrupted, and the first current value may mean a current value smaller than the second current value.

Herein, the disclosed embodiments may be implemented in the form of a recording medium storing instructions executable by a computer. The instructions may be stored in the form of program code, and when executed by a processor, a program module may be created to perform the operations of the disclosed embodiments. The recording medium may be implemented as a computer-readable recording medium.

The computer-readable recording medium includes various kinds of recording media in which instructions which may be decrypted by a computer are stored. For example, there may be a ROM (Read Only Memory), a RAM (Random Access Memory), a magnetic tape, a magnetic disk, a flash memory, an optical data storage device, and the like.

The embodiments disclosed with reference to the accompanying drawings have been described above. It will be understood by those skilled in the art that various changes in form and details may be made therein without departing from the spirit and scope of the disclosure as defined by the appended claims. The disclosed embodiments are illustrative and should not be construed as limiting.

As is apparent from the above, according to an embodiment of the disclosure, when the battery charging of an electric vehicle is interrupted, the cause of the interruption is quickly analyzed, so that a preemptive measure may be performed.

While the disclosure has been described in connection with certain embodiments, it will be understood that it is not intended to limit the invention to those particular embodiments. On the contrary, it is intended to cover all alternatives modifications, and equivalents included within the spirit and scope of the disclosure as defined by the appended claims.

The invention claimed is:

1. A vehicle comprising:
   a battery; and
   a controller configured to:
   check identification information of a charger when the charger and the battery are connected;
   determine whether a charging interruption history exists in the charger based on the identification information of the charger;
   determine whether a user consents to perform recharging of the battery with a first current value in a case where the charging interruption history exists; and
   perform the recharging of the battery with the first current value when the user consents.

2. The vehicle according to claim 1, further comprising a storage configured to store the charging interruption history information corresponding to the identification information of the charger.

3. The vehicle according to claim 1, wherein the controller is further configured to store the charging interruption history information corresponding to the identification information of the charger in an external server in a case where a charging interruption occurs during charging of the battery.

4. The vehicle according to claim 1, wherein the first current value is smaller than a current value of the charger when charging is interrupted.

5. The vehicle according to claim 1, wherein the controller is configured to set to perform recharging of the battery from the charger with a second current value in a case where the charging interruption history does not exist.

6. The vehicle according to claim 1, wherein the controller is configured to set to perform recharging of the battery from the charger with the first current value when the user consents.

7. The vehicle according to claim 1, wherein the controller is configured to set to perform recharging of the battery from the charger with a second current value when the user does not consent.

8. The vehicle according to claim 7, wherein the first current value is smaller than the second current value.

9. The vehicle according to claim 1, wherein the controller is configured to determine whether the user consents or not using at least one of an audio video navigation (AVN) and a terminal of the user.

10. The vehicle according to claim 1, wherein the controller is configured to determine whether the charging interruption history exists by accessing an external server.

11. A control method of a vehicle comprising:
   checking, by a controller, identification information of a charger when the charger and a battery are connected;
   determining whether a charging interruption history exists in the charger based on the identification information of the charger;
   determining whether a user consents to perform recharging of the battery from the charger with a first current value in a case where the charging interruption history exists; and
   performing the recharging of the battery with the first current value when the user consents.

12. The control method according to claim 11, further comprising storing the charging interruption history information corresponding to the identification information of the charger in the vehicle.

13. The control method according to claim 11, further comprising storing the charging interruption history information corresponding to the identification information of the charger in an external server when a charging interruption occurs during charging of the battery.

14. The control method according to claim 11, wherein the first current value is smaller than a current value of the charger when charging is interrupted.

15. The control method according to claim 11, further comprising performing recharging of the battery from the charger with a second current value when the charging interruption history does not exist.

16. The control method according to claim 11, further comprising performing recharging of the battery from the charger with the first current value when the user consents.

17. The control method according to claim 11, further comprising performing recharging of the battery from the charger with a second current value when the user does not consent.

18. The control method according to claim 17, wherein the first current value is smaller than the second current value.

19. The control method according to claim 11, further comprising determining whether the user consents using at least one of an audio video navigation (AVN) and a terminal of the user.

20. The control method according to claim 11, further comprising determining whether the charging interruption history exists by accessing an external server.

* * * * *